United States Patent
Miyashita et al.

(10) Patent No.: US 6,264,343 B1
(45) Date of Patent: *Jul. 24, 2001

(54) INPUT TABLET AND LIQUID CRYSTAL DISPLAY DEVICE UTILIZING SUCH TABLET

(75) Inventors: Satoru Miyashita; Osamu Yokoyama; Tatsuaki Funamoto, all of Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/969,790

(22) Filed: Nov. 13, 1997

(30) Foreign Application Priority Data

Nov. 14, 1996 (JP) .................................................. 8-303390

(51) Int. Cl.[7] ............................................................ F21V 7/04
(52) U.S. Cl. ........................................... 362/31; 362/26
(58) Field of Search .............................. 362/31, 551, 97, 362/99, 300, 311, 327, 26, 330, 98; 349/65; 178/18.1

(56) References Cited

U.S. PATENT DOCUMENTS

| | | | | |
|---|---|---|---|---|
| 4,779,166 | * | 10/1988 | Tanaka | 362/31 |
| 5,153,386 | | 10/1992 | Siefer et al. | |
| 5,274,198 | * | 12/1993 | Landmeier | 178/18 |
| 5,359,155 | * | 10/1994 | Helser | 178/18 |
| 5,396,350 | * | 3/1995 | Beeson | 362/31 |
| 5,584,556 | * | 12/1996 | Yokoyama | 362/31 |
| 5,719,649 | * | 2/1998 | Shono et al. | 362/31 |
| 5,736,686 | * | 4/1998 | Perret, Jr. et al. | 178/18 |
| 5,771,039 | * | 6/1998 | Ditzik | 345/178 |

FOREIGN PATENT DOCUMENTS

| | | | |
|---|---|---|---|
| 0545705A1 | * | 6/1991 | (EP) ............................. G02F/1/1335 |
| A1-0-545-705 | | 6/1993 | (EP) . |
| 6-324331 | | 11/1994 | (JP) . |

* cited by examiner

Primary Examiner—Sandra O'Shea
Assistant Examiner—Peggy A Neils
(74) Attorney, Agent, or Firm—Oliff & Berridge, PLC (57) ABSTRACT

A cost-effective and simple construction of an easy to see and bright digitizer tablet with a two-dimensional illuminating function having a light source for radiating a bundle of light, and light-guide means having a light entering face into which said bundle of light enters, which guides said bundle of light towards the light-emitting face, to illuminate the illuminated body. A liquid crystal display device including this digitizer tablet is also provided. The light-guide contains a flat, transparent light-guide body with a face vertical to said light entering face as said light-emitting face, wherein a protrusion made of a substantially parallel bottom face and a substantially perpendicular side face to said light-emitting face is formed integrally with said light-emitting face. The protrusion may also be formed of a plurality of rib-shaped protruding bodies. The ratio between the width and height of each of these protruding bodies is roughly 1:1.

41 Claims, 6 Drawing Sheets

INPUT TABLET AND LIQUID CRYSTAL DISPLAY DEVICE UTILIZING SUCH TABLET

BACKGROUND OF THE INVENTION

The present invention relates to a digitizer tablet with a two-dimensional lighting function and a liquid crystal display device utilizing such tablet.

Digitizer tablets are generally classified by their detection methods into the resistance detection method, the electrostatic capacity method, and the electromagnetic induction method, etc., but structurally, they are generally made of a transparent substrate having one or more transparent electrodes. Normally used for the transparent substrate are glass plates or PET (polyethylene terephthalate), and ITO or tin oxide is used for the transparent electrode. The transparent electrode may be used uniformly over the whole surface, but also in a patterned form. In order to improve the writing feel and to prevent glare effects, the pen Input face is structured to have a plastic film pasted thereon or to provide a fine jog on its surface. Digitizer tablets are used not only as an input device alone but also as a device which can be combined with a CRT or LCD and operate information via a display screen.

Among the prior art, an illuminating device to be arranged in front of a liquid crystal display device is known from Patent Laid-Open Hei 6(1994)-324331. According to the device with the structure proposed therein, illumination can be obtained which is suitable for use with the reflective liquid crystal display mode used widely with various portable equipment.

However, as digitizer tablets with conventional structure have a transparent substrate with one or more transparent electrodes, although there may have been almost no attenuation of the quantity of light inside the transparent substrate, 10% or more of the quantity of light was lost particularly due to surface reflection at the interface between the, transparent electrode and air, thereby becoming dark. Another problem was that as the panel was difficult to look at due to surface reflection, this was especially an issue in the combined use with a display component. Moreover, when pasting an anti-glare film or providing a fine jog on the surface as glare-proof measures, the quantity of light was reduced by another 10% to 20% of the total light transmission, and the contrast effect was reduced due to the irregular reflection on the surface, thereby reducing the picture quality of the display.

The present invention aims at resolving these-problems of the prior art by providing a cost-effective, sample structure of an easy to see, bright digitizer tablet with a two-dimensional illuminating function, and a liquid crystal display device including a digitizer tablet which is especially suitable for use with reflective liquid crystal display modes.

SUMMARY OF THE INVENTION

In order to solve the above problems, the digitizer tablet according to the present invention includes a light source for radiating a bundle of light, and a light-guide element having an light entering face into which the bundle of light enters and which guides the bundle of light entering from the light entering face towards the light-emitting face to illuminate the illuminated body from the light-emitting face.

Preferably, the light-guide element means includes a flat, transparent light-guide body having a light emitting face and an opposite face. The light emitting face is perpendicular to the light entering face. The light emitting face is pasted with a film body having a protrusion thereon. The protrusion includes a bottom protrusion face and a side protrusion face. The bottom protrusion face is substantially parallel to the light emitting face and the side protrusion face is substantially perpendicular to the light emitting face. For example, the protrusion may be formed of a plurality of rib-shaped protruding bodies. In this case, the ratio between the width and the height of each of said protruding bodies is roughly 1:1. The protrusion may also be formed of a plurality of cylindrical protruding bodies. In this case, the ratio between the diameter and the height of each of the protruding bodies is also roughly 1:1.

Preferably, a transparent electrode is provided on the opposite face on the side opposite to the light emitting face of the said light-guide body.

Furthermore, the liquid crystal display device according to the present invention may include a liquid crystal display panel with a display face and a digitizer tablet arranged on the side of said display face of the liquid crystal display panel, wherein the digitizer tablet comprises a light source for radiating a bundle of light, and light-guide means having an light entering face into which the bundle of light enters and which guides the bundle of light entering from the light entering face towards the light-emitting face to illuminate the illuminated body from the light-emitting face.

For example, the liquid crystal display panel may be a reflective display. Preferably, the light-guide element includes a flat, transparent light-guide body with a light emitting face and an opposite face. The light emitting face is perpendicular to the light entering face. The light emitting face is pasted with a film body having a protrusion thereon. The protrusion includes a bottom protrusion face and a side protrusion face. The bottom protrusion face is substantially parallel to the light emitting face and the side protrusion face is substantially perpendicular to the light emitting face. Furthermore, a polarized plate may be arranged in front of the light-guide plate on the opposite to said light emitting face of the light-guide plate.

According to present invention, a cost-effective and simple construction of an easy to see and bright digitizer tablet with a two-dimensional illuminating function can be provided. In particular, a liquid crystal display device can be provided which includes a digitizer tablet suitable for reflective liquid crystal display modes. For the use with a portable computer terminal or the like, it is possible to provide a liquid crystal display without reduction of the picture quality of the display even when putting out the illumination in bright places to save power, and which can effect a high contrast during the lighting.

DESCRIPTION OF THE PREFERRED EMBODIMENTS

Now, embodiments of the present invention will be described below with reference to the drawings. A representative digitizer tablet will be explained by using the resistance detecting method, but principally, any arbitrary method may be used.

First Embodiment

A digitizer tablet relating to a first embodiment of the present invention will be described with reference to FIGS. 1 through 4. This digitizer tablet includes a light-guide plate 11 as the light-guide body. The light-guide plate 11 is structured as a transparent substrate with transparent electrodes formed thereon. A light source 2 has been arranged on the side at one end of the light-guide plate 11. The light-guide plate 11 possesses the function of causing the bundle of light from the light source 2 to enter from its light entering side and emitting such light as illuminating light mainly in the direction of one face (light-emitting face), and the function of transmitting the opticalray in a direction crossing the plate surface plane of the light-guide plate 11 without incurring dispersion. A reflector is arranged to surround the light source 2, and the optical ray from the light source 2 is effectively guided toward the light-guide plate 11. Adjacent to the light guide plate 11, the illumtinated object 6 is arranged at the side of its light emitting face, and a film with transparent electrode is arranged at the side opposite to its light emitting face via a spacer.

Figure 1:
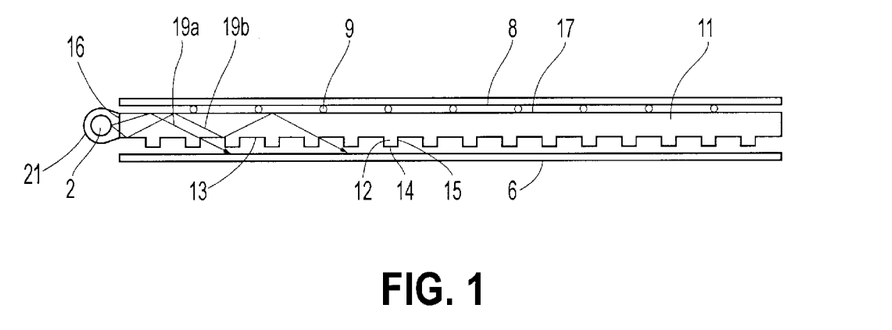
FIG. 1 is a schematic cross section of a digitizer tablet structure relating to one embodiment of the present invention.

This structure will be described in detail below. The whole light-guide plate is formed as a rectangular plate having a long side and a short side, and has four end faces formed on the plate face in the direction of the plate face which crosses the direction of the plate width in a right angle. These four faces define the side faces of the light guide plate 11. Among these four end faces, a light source 2 which is a line-shaped optical source 2 such as a fluorescent lamp is arranged along the light entering face of the light-guide plate at a position opposite to one end face on the short side. This light source 2 may be structured as point-shaped light sources arranged in a row.

Figure 2:
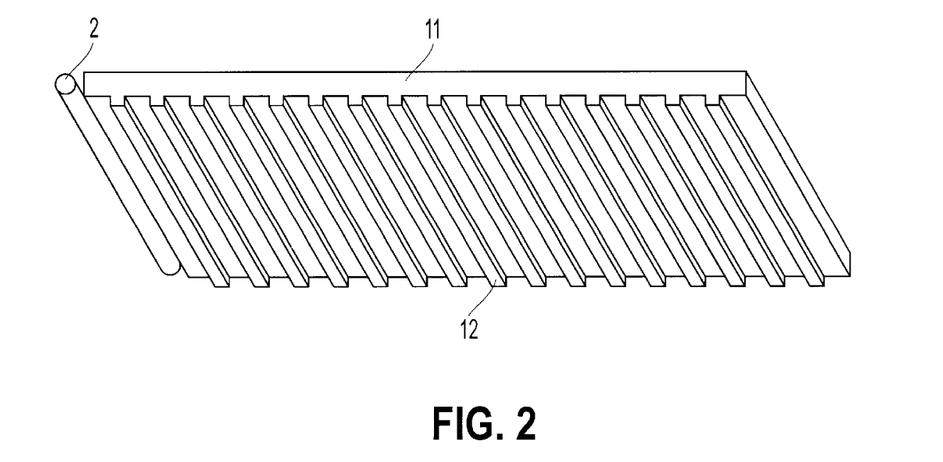
FIG. 2 is a perspective view describing a light-guide plate.

The two surfaces of the light-guide plate 11 are formed as a light-emitting face 13 and an opposite face 17. As shown in FIG. 2, the light emitting face 13 is provided with a rib-shaped protrusion 12 roughly parallel to the light source 2. The faces of the protrusion 12 are all constructed only of faces substantially parallel to the emitting face 13 (bottom protrusion face 14), and faces substantially perpendicular to the emitting face 13 (side protrusion face 15).

The light-guide plate 11 is formed of a transparent material with a refractivity of roughly 1.4 or more. The bundle of light emitted from the light source 2 enters the light-guide plate 11 from the light entering face 16 as shown by the optical rays 19a and 19b, and thereafter repeats total reflection therein and is emitted only from the side protrusion face 15 of the protrusion 12. Therefore, the light emission from the back face of the illuminating device is great, thereby enabling the effective illumination of the illuminated object 6.

Used for the transparent material forming the light-guide plate 11 may be transparent resin such as acryl resin, polycarbonate resin and amorphous polyolefine resin, or inorganic transparent material such as glass, or combinations thereof. The light-guide plate 11 maybe structured by a method of forming the protrusion through integral molding such as injection molding, cast molding, extrusion molding, or by etching a photo-curing resin on a transparent substrate, etc. On the face opposite the protrusion, a transparent electrode such as ITO is formed on the light-guide plate 11 by vapor deposition or sputtering and then subjected to any necessary photo-etching. The light-guide plate may also-be constructed simply by methods such as pasting a film with a protrusion formed in advance thereon to the back face of a currently mass produced, flat glass plate with a transparent electrode thereon, or by coating a thin, transparent resin film on the plate, and then shaping the film by a roller with a jog.

A reflector 21 is arranged to surround the light source 2, which operates to effectively guide the optical ray from the light source 2 to the light-guide plate 1. Mainly used as the reflector 21 is a resin film or a resin molding which is colored white, or an aluminum or silver vapor deposited film is applied thereto. These have a high rate of reflecting optical rays, and are effective for improving the power to luminance ratio.

A transparent electrode is formed on the side of the opposite face 17 of the light-guide plate 11, and the film 8 with the transparent electrode is arranged via the spacer 9. The distance between the light-guide plate 11 and the transparent film 8 is not too close, and there exists a layer of air. If there is a slightest scratch on the surface of the light-guide plate 11, the optical ray guided through the inside thereof will be reflected thereon, which will be recognized as bright points or lines from the surface. These are not only unbecoming as a transmission-type illumination, but also considerably reduce the visual effect, such as a reduced contrast effect. As the transparent film 8 has a layer of air between itself and the light-guide plate 11, the bundle of light from the light source 2 will not enter, and scratches here will incur no bright points or lines. In this case, the relative area space of the scratch is very small, so any influences on the visual effect with regard to the illuminated object will be very small. The transparent plate a may be made of a transparent resin such as acryl resin, polycarbonate resin or amorphous polyolefine resin, or an inorganic transparent material such as glass. When using the structure of pasting a transparent film with a protrusion thereon on a transparent substrate, the transparent film may be a resin film made of polyester, polycarbonate, polypropylene or acetate, etc.

Figure 3A:
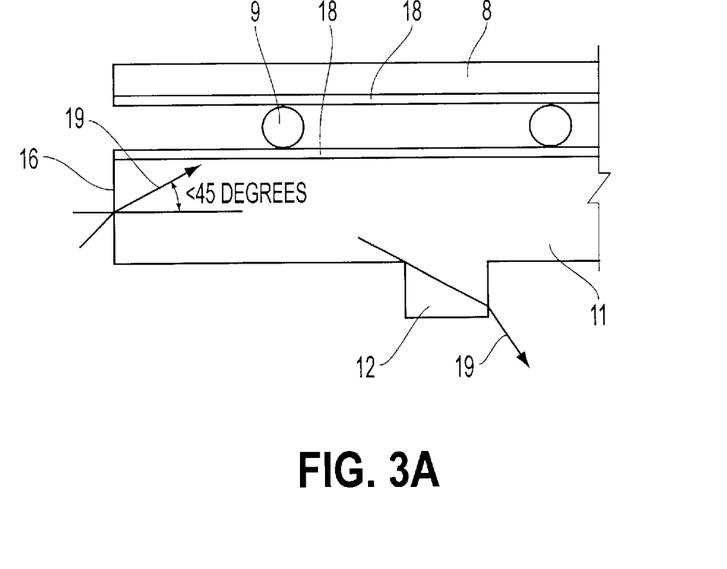
FIG. 3A is a view explaining the light-guiding movements of the light-guide plate.
Figure 3B:
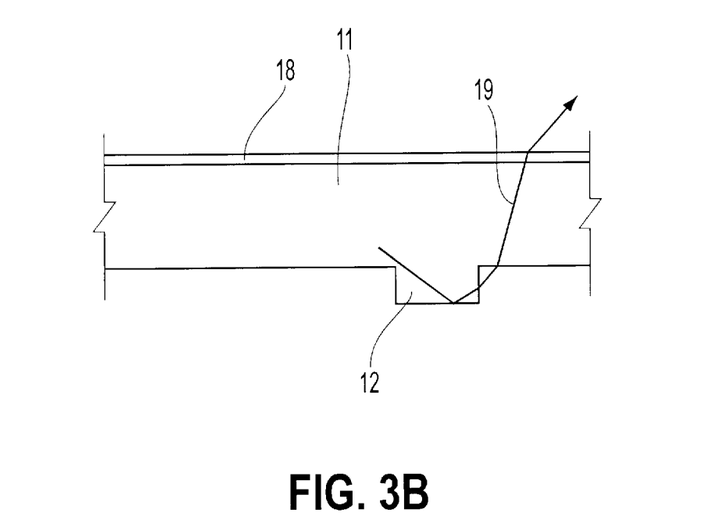
FIG. 3B is a view explaining the light-guiding movements of the light-guide plate.

As shown in FIG. 3A, the optical axis of the optical ray 19 entering from the light entering face 16 forms an angle of 45° with the axis of the light-guide plate 11 in the direction of its long side protrusion due to refraction, so in order for the side face of the protrusion 12 to be illuminated, the height of the protrusion needs to be equal to or greater than the width. If the height is smaller than the width, the optical ray 19 is emitted towards the upper face of light guiding plate 11 in accordance with the path shown in FIG. 3B, and the visual effect is greatly reduced. However, if the ratio 1:1 is greatly exceeded, there will be no sense from an optical view in having provided this device, and it will be difficult to manufacture the device. This will also cause the visual effect to be reduced when looking at the illuminating device from a diagonal viewpoint. Therefore, it is desirable to set the ratio between the width and the height of the protrusion 12 to approximately 1:1.

As the wavelength of visible light is approximately 380 nm to 700 nm, the sizes such as the width and height of the protrusion 12 need to be set to 5 $\mu$m or more in order to avoid a striped spectrum due to interference by diffraction, and as the size of the picture elements of the- liquid crystal display panel is 200 $\mu$m to 300 $\mu$m, the sizes of the protrusion 12 need to be 100 $\mu$m or less to prevent stripes due to interference with these picture elements. In addition to these points, the size of the protrusion 12 is desirably between a minimum of 10 $\mu$m and a maximum of 50 $\mu$m in view of manufacturing conveniences.

Figure 4:
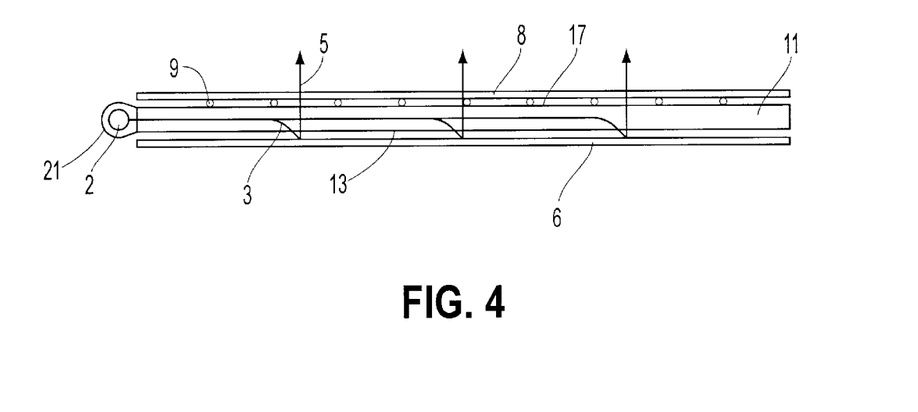
FIG. 4 is a view explaining the light-guiding movements over the whole light-guide plate.

By adjusting the density of the protrusions 12 on the light-guide plate 11, it is possible to increase the uniformity of the illumination luminance. Specifically, the protrusions 12 in the vicinity of the light source 2 are placed apart from each other, and in accordance with the distance from the light source 2, they are successively placed closer to each other. There are methods of changing the density while fixing the size of the protrusion 12, changing the size while fixing the density, or changing both, etc., but simple and advantageous is a method of changing the density while fixing the size of the protrusion 12 during the actual processing.

A transparent electrode 18 is formed on the upper face of the light-guide plate 11. ITO or tin oxide may be used as the transparent electrode, and the refractivity is 1.7 or more, which is higher than that of the transparent substrate. Due to the existence of the transparent electrode, there is no bad effect such as the emission of optical rays 19 onto the upper face of the light-guide plate 11. The film 8 with the transparent electrode 18 thereon is arranged via a spacer 9, so the detection of the position Is possible similarly to the common method of detecting the resistance. Furthermore, as a bright illumination close to the illuminated object 6 is possible, a low transmission rate of the digitizer tablet or any clouding effect will not be of much concern, thereby providing a good visual effect.

According to the description above, the digitizer tablet of the present embodiment is able to take over the function of emitting the bundle of light from the light source 2 arranged at the light entering face as an illuminating light 3 mainly towards one of the faces, namely the direction of the light-emitting face 13, and also the function of transmitting the optical ray 5 crossing the direction of the flat plate of the light-guide plate 11 with almost no dispersion. Therefore, when there is sufficient exterior light, the light source 2 can be extinguished, in which case the light-guide plate 11 will simply function as a transparent plate. Furthermore, when the exterior light is insufficient, the light source 2 is put on, enabling illumination of the illuminated object 6.

Suitable as the illuminated object 6 for the above illuminating device are printed matters printed on paper or the like, or liquid crystal display bodies. etc.

Second Embodiment

Figure 5:
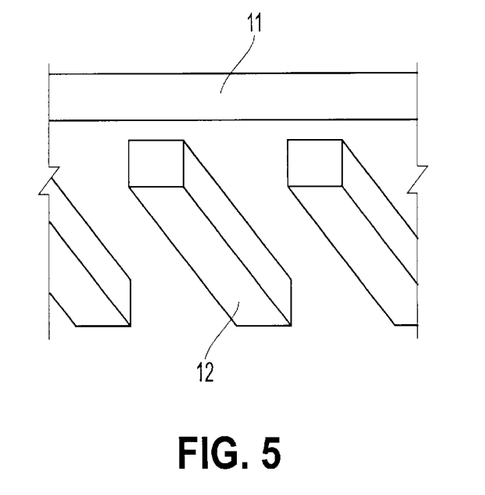
FIG. 5 is a perspective view explaining the protrusion of the digitizer tablet relating to a second embodiment of the present invention.

A second embodiment is shown in FIG. 5. In this embodiment, the protrusion 12 is formed as a prism, and in this case, the same effects as with the rib described above can be obtained. The side protrusion face of the protrusion 12 which is perpendicular in direction to which the light source 2 extends is illuminated by the optical ray at the critical angle or a greater angle, so that the optical ray is totally reflected, and has absolutely no effect on the light emission.

Third Embodiment

Figure 6:
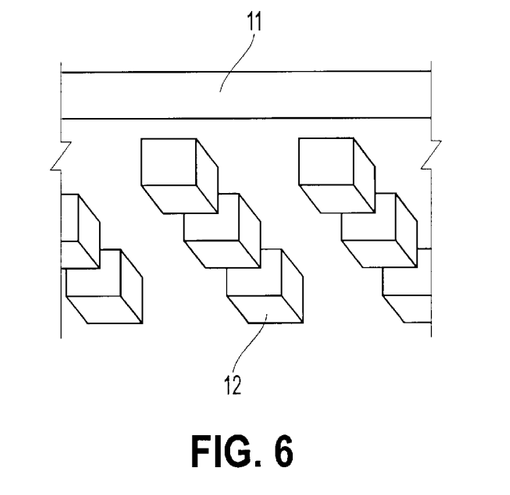
FIG. 6 is a perspective view explaining the protrusion of the digitizer tablet relating to a third embodiment of the present invention.

A third embodiment is shown in FIG. 6. In this embodiment, a prism with a square bottom face has been formed on the substantially rectangular light-guide plate 11, and in this case, two light sources are arranged at two neighboring sides of the light-guide plate 11, and it is possible to emit the optical rays entering from such two sides from each of the side faces of the protrusion 12.

Fourth Embodiment

Figure 7:
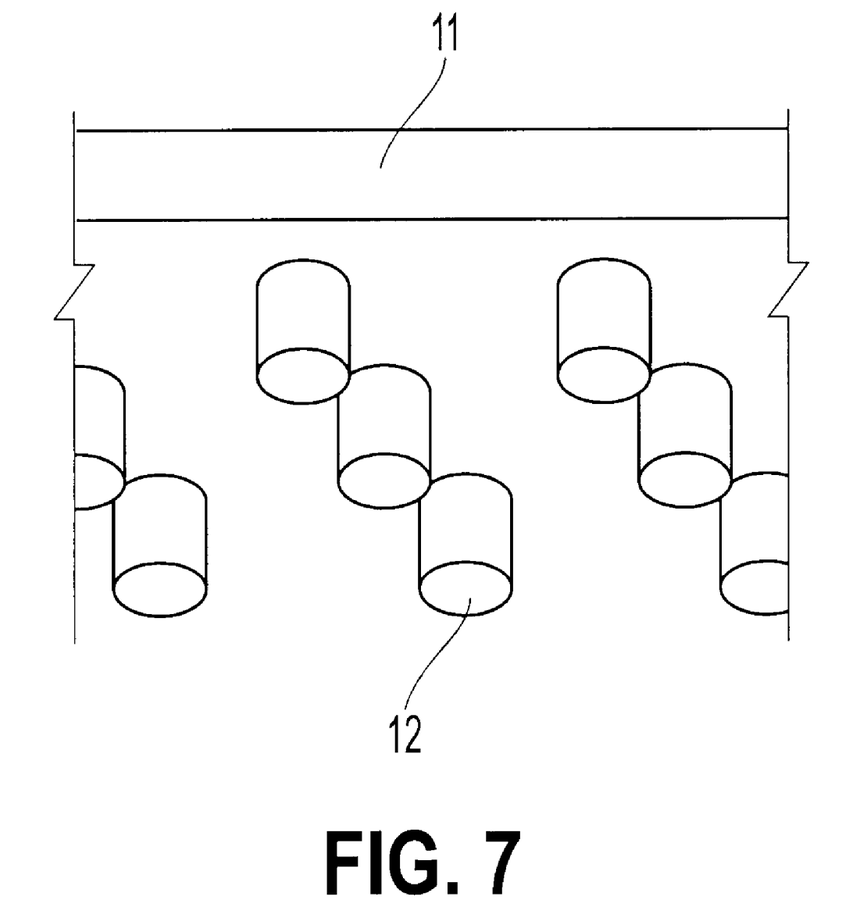
FIG. 7 is a perspective view explaining the protrusion of the digitizer tablet relating to a fourth embodiment of the present invention
Figure 8A:
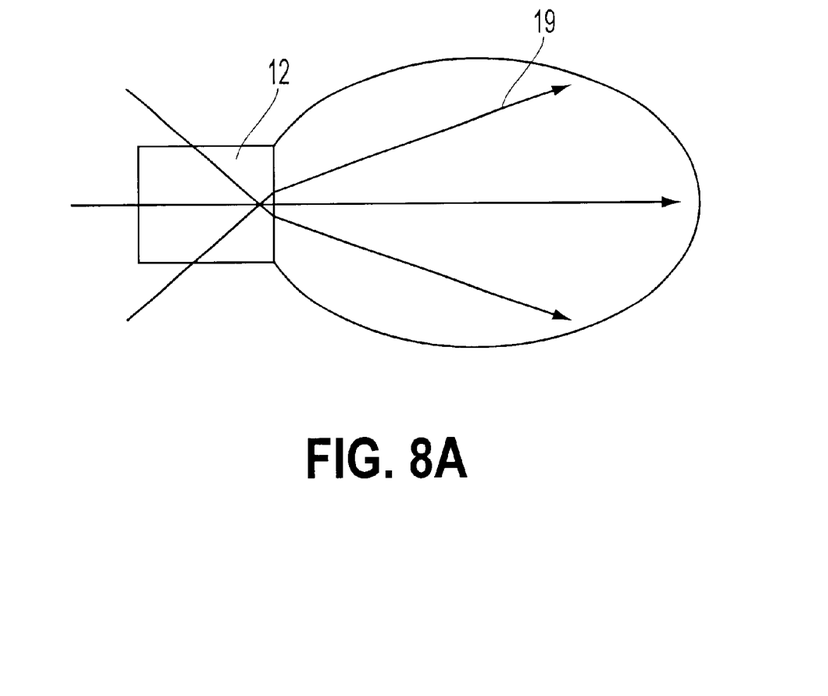
FIG. 8A is a view explaining the illumination range of the emitted optical ray when the protrusion is a prism.
Figure 8B:
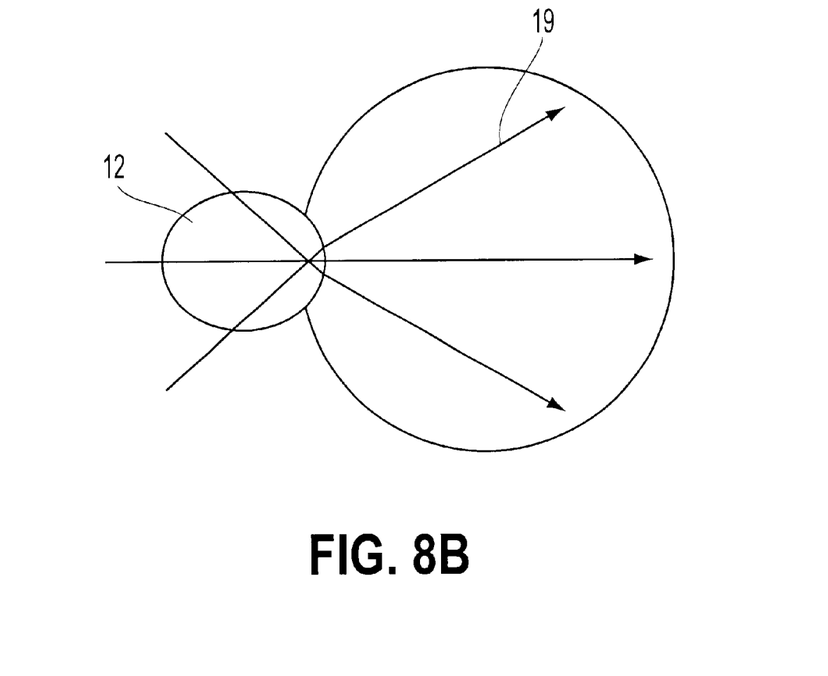
FIG. 8B is a view explaining the illumination range of the emitted optical ray when the protrusion is a cylinder.

A fourth embodiment is shown in FIG. 7 with the protrusion 12 formed in the shape of a cylinder. The optical ray 19 illuminated onto the cylindrical face of the protrusion 12 at a critical angle or a smaller angle is emitted, and the optical ray illuminated at a critical angle or a greater angle is repeatedly reflected on the cylindrical face, then reverted on the bottom face of the protrusion 12 and after repeating reflection by the cylindrical face, proceeds along a path inside the light-guide plate. The illumination range of the optical ray 19 emitted from the cylindrical face as shown in FIG. 8B can be widened more than compared to the prism shown in FIG. 8A.

Fifth Embodiment

Figure 9:
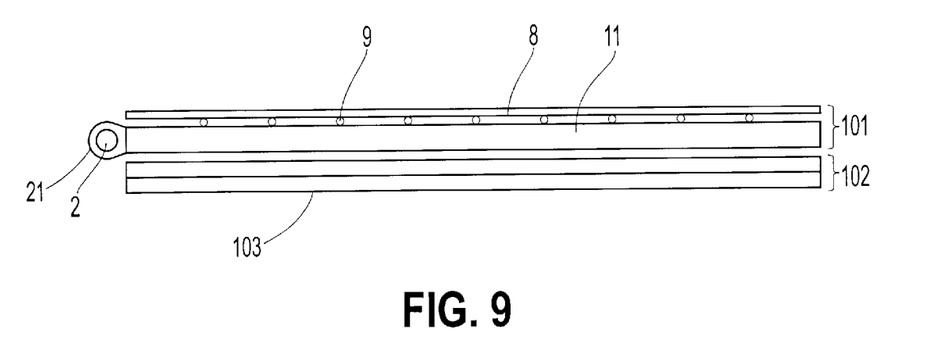
FIG. 9 is a schematic cross section of the liquid crystal display device relating to a fifth embodiment of the present invention.

A fifth embodiment is shown in FIG. 9. This embodiment uses a liquid crystal display panel as the illuminated object. The digitizer tablet 101 including illuminating functions is arranged in front of the liquid crystal display panel 102. On the back face of the liquid crystal display panel 102, a reflecting plate 103 has been arranged to construct a reflective liquid crystal display device.

The digitizer tablet 101 functions to project the optical ray towards the liquid crystal display panel 102, and at the same time to transmit the optical ray reflected by the reflecting plate 103 with almost no dispersion. As the illumination of the digitizer tablet 101 is put out if the exterior light is sufficient, and in this case, the digitizer tablet 101 with an illuminating function operates as a simple digitizer tablet without affecting the visual effect and without influencing the display quality, which is advantageous. When using the digitizer tablet 101 in dark places where the exterior light is not sufficient with the light put on, the digitizer tablet 101 with the illuminating function:illuminates the liquid crystal display panel 102, and the light reflected by the reflecting plate 103 Is transmitted because the digitizer tablet 101 with the illuminating function operates similar to the state when the light is put off as a simple digitizer tablet, which is effective in maintaining a high visual effect.

Furthermore, while on one hand the transmissive liquid crystal display device with the illuminating device arranged behind the liquid crystal display panel causes dark-light contrasts, by transmitting the optical ray from the illuminating device only once through the liquid crystal display panel, the reflective liquid crystal display device with the illuminating device arranged in front of the liquid crystal display panel according to the present invention causes the optical ray from the illuminating device to be transmitted once through the liquid crystal display panel, then reflected by the reflecting plate, and thereafter transmitted once more through the liquid crystal display panel, so that the contrast becomes greater, and effective in obtaining a greater visual effect.

Sixth Embodiment

Figure 10:
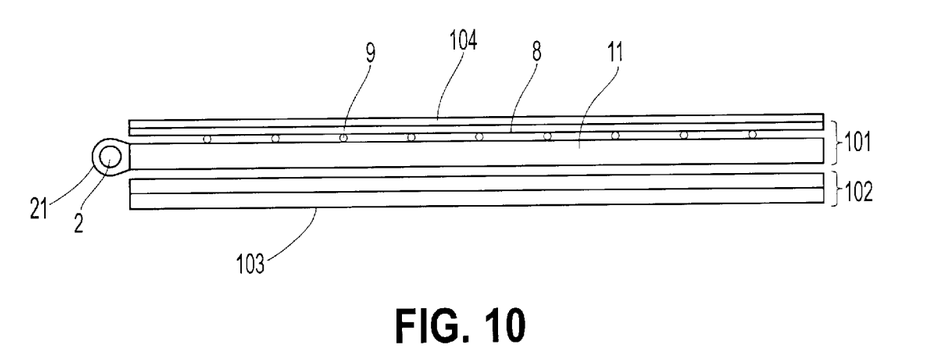
FIG. 10 is a schematic cross section of the liquid crystal display device relating to a sixth embodiment of the present invention.

A sixth embodiment is shown in FIG. 10. A light-guide plate 11 is superposed immediately above the liquid crystal display body, and a polarized plate 104 is superposed on a transparent film 8 which is above the light-guide plate 11. The uppermost surface of the polarized plate 104 is coated with an anti-glare treated hard coating, and will not be scratched through the pen input movements. Furthermore, even with more or less scratches, there was almost no affect on the visual effect of the liquid crystal display body.

The liquid crystal display body has one polarized plate on its top and bottom, respectively, but the polarization axis of the polarized plate 104 on the top of the light-guide plate has been made to correspond to the polarized plates. This polarized plate cuts out any light scattering towards the top of the light-guide plate, which can improve the visual effect of the liquid crystal display body.

What we claim is:

1. A digitizer tablet comprising a light source for radiating a bundle of light, and a light-guide element having a light entering face into which said bundle of light enters, and which guides said bundle of light entering from the light entering face towards a light emitting face to illuminate an illuminated body from said light emitting face, said light-guide element comprising a flat, transparent light-guide body with said light emitting face having a face perpendicular to said light entering face, said light emitting face having formed thereon at least one protrusion having a bottom protrusion face substantially parallel to said light emitting face and a side protrusion face substantially perpendicular to said light emitting face, at least one protrusion being formed integrally with said light emitting face, wherein a transparent electrode is provided on said light-guide body at a side opposite to said light emitting face, the transparent electrode is arranged via a layer of air on the side opposite to the light emitting face.

2. The digitizer tablet according to claim 1, said at least one protrusion being formed of a plurality of rib-shaped protruding bodies.

3. The digitizer tablet according to claim 2, a ratio between a width and a height of each of said protruding bodies being roughly 1:1.

4. The digitizer tablet according to claim 1, said at least one protrusion being formed of a plurality of rib-shaped protruding bodies.

5. The digitizer tablet according to claim 4, a ratio between a diameter and a height of each of said protruding bodies being roughly 1:1.

6. A digitizer tablet comprising a light source for radiating a bundle of light, and a light-guide element having a light entering face into which said bundle of light enters, and which guides said bundle of light entering from the light entering face towards a light-emitting face to illuminate an illuminated body from said light emitting face, said light-guide element comprising a flat, transparent light-guide body with a face perpendicular to said light entering face as said light emitting face, and a film body pasted on said light emitting face and having at least one protrusion formed thereon having a bottom protrusion face substantially parallel to the light emitting face and a side protrusion face substantially perpendicular to the light emitting face, wherein a transparent electrode is provided on said light-guide body at a side opposite to said light emitting face, the transparent electrode being arranged via a layer of air on the side opposite to the light emitting face.

7. The digitizer tablet according to claim 6, said at least one protrusion being formed of a plurality of rib-shaped protruding bodies.

8. The digitizer tablet according to claim 7, a ratio between a width and a height of each of said protruding bodies is roughly 1:1.

9. The digitizer tablet according to claim 6, said at least one protrusion being formed of a plurality of cylindrical protruding bodies.

10. The digitizer tablet according to claim 9, a ratio between a diameter and a height of each of said protruding bodies being roughly 1:1.

11. A liquid crystal display device comprising a liquid crystal display panel with a display face and a digitizer tablet arranged on a side of said display face of the liquid crystal display panel, said digitizer tablet comprising a light source for radiating a bundle of light, and a light-guide element having a light emitting face into which said bundle of light enters, which guides said bundle of light entering from the light entering face towards a light emitting face to illuminate an illuminated body from said light emitting face, said light-guide element comprising a flat, transparent light-guide body with a face perpendicular to said light entering face as said light emitting face, said light emitting face having formed thereon at least one protrusion having a bottom protrusion face substantially parallel to said light emitting face formed integrally with said light emitting face, wherein a transparent electrode is provided on said light-guide body at a side opposite to said light emitting face, the transparent electrode is arranged via a layer of air on the side opposite to the light emitting face.

12. The liquid crystal display device according to claim 11, said liquid crystal display panel being a reflecting reflective display.

13. The liquid crystal display device according to claim 12, said light-guide element comprising a flat, transparent light-guide body with a face perpendicular to said light entering face as light emitting means.

14. The liquid crystal display device according to claim 12, further comprising a polarized plate arranged in front of the light-guide plate on a side of said light-guide plate opposite to said light emitting face.

15. The digitizer tablet according to claim 1, the at least one protrusion having a height and a width of between 10 μm and 50 μm.

16. The digitizer tablet according to claim 1, the bottom face of the at least one protrusion having a square shape and the light source being provided on adjacent sides of the end faces of the light-guide element.

17. The digitizer tablet according to claim 6, the at least one protrusion having a height and a width of between 10 μm and 50 μm.

18. The digitizer tablet according to claim 6, the bottom face of the at least one protrusion having a square shape and the light source being provided on adjacent sides of the end faces of the light-guide element.

19. The liquid crystal display according to claim 11, the at least one protrusion having a height and a width of between 10 μm and 50 μm.

20. The liquid crystal display tablet according to claim 11, the bottom face of the at least one protrusion having a square shape and the light source being provided on adjacent sides of the end faces of the light-guide element.

21. A digitizer tablet comprising a light source for radiating a bundle of light, a light-guide element having a light entering face into which said bundle of light enters, and which guides said bundle of light entering from the light entering face towards a light emitting face to illuminate an illuminated body from said light emitting face, and an input element arranged on one end face of said light-guide element and having a transparent electrode, said light-guide element comprising a flat, transparent light-guide body with a face perpendicular to said light entering face as said light emitting face, said light emitting face having formed thereon at least one protrusion having a bottom protrusion face substantially parallel to said light emitting face and a side protrusion face substantially perpendicular to said light emitting face, said at least one protrusion being formed integrally with said light emitting face, and reflected light from an object of illumination being emitted upon being transmitted through said light-guide element and said input element, wherein a transparent electrode is provided on said light-guide body at a side opposite to said light emitting face, the transparent electrode is arranged via a layer of air on the side opposite to the light emitting face.

22. The digitizer tablet according to claim 21, said at least one protrusion being formed of a plurality of rib-shaped protruding bodies.

23. The digitizer tablet according to claim 22, a ratio between a width and a height of each of said protruding bodies being roughly 1:1.

24. The digitizer tablet according to claim 21, said at least one protrusion being formed of a plurality of rib-shaped protruding bodies.

25. The digitizer tablet according to claim 24, a ratio between a diameter and a height of each of said protruding bodies being roughly 1:1.

26. A digitizer tablet comprising a light source for radiating a bundle of light, a light-guide element having a light entering face into which said bundle of light enters, and which guides said bundle of light entering from the light entering face towards a light emitting face to illuminate an illuminated body from said light emitting face, and an input element arranged on one end face of said light-guide element and having a transparent electrode, said light-guide element comprising a flat, transparent light-guide body with a face perpendicular to said light entering face as said light emitting face, a film body pasted on said light emitting face having formed thereon at least one protrusion having a bottom protrusion face substantially parallel to said light emitting face and a side protrusion face substantially perpendicular to said light emitting face, said at least one protrusion being formed integrally with said light emitting face, and reflected light from an object of illumination being emitted upon being transmitted through said light-guide element and said input element, wherein a transparent electrode is provided on said light-guide body at a side opposite to said light emitting face, the transparent electrode is arranged via a layer of air on the side opposite to the light emitting face.

27. The digitizer tablet according to claim 26, said at least one protrusion being formed of a plurality of rib-shaped protruding bodies.

28. The digitizer tablet according to claim 27, a ratio between a width and a height of each of said protruding bodies is roughly 1:1.

29. The digitizer tablet according to claim 26, said at least one protrusion being formed of a plurality of cylindrical protruding bodies.

30. The digitizer tablet according to claim 29, a ratio between a diameter and a height of each of said protruding bodies being roughly 1:1.

31. A liquid crystal display device comprising a liquid crystal display panel with a display face and a digitizer tablet arranged on a side of said display face of the liquid crystal display panel, said digitizer tablet comprising a light source for radiating a bundle of light, and a light-guide element having a light entering face into which said bundle of light enters, which guides said bundle of light entering from the light entering face towards a light emitting face to illuminate an illuminated body from said light emitting face, and an input element arranged on one end face of said light-guide element and having a transparent electrode, said light-guide element comprising a flat, transparent light-guide body with a face perpendicular to said light entering face as said light emitting face, said light emitting face having formed thereon at least one protrusion having a bottom protrusion face substantially parallel to said light emitting face formed integrally with said light emitting face, and reflected light from an object of illumination being emitted upon being transmitted through said light-guide element and said input element, wherein a transparent electrode is provided on said light-guide body at a side opposite to said light emitting face, the transparent electrode is arranged via a layer of air on the side opposite to the light emitting face.

32. The digitizer tablet according to claim 31, said liquid crystal display panel being a reflective display.

33. The digitizer tablet according to claim 32, said light-guide means comprising a flat, transparent light-guide body with a face perpendicular to said light entering face as said light emitting face, and a protrusion made of a bottom protrusion face substantially parallel and a side protrusion face substantially perpendicular to said light emitting face being formed on said light emitting face.

34. The digitizer tablet according to claim 32, said light-guide element comprising element comprising a flat, transparent light-guide body with a face perpendicular to said light entering face as light emitting means.

35. The digitizer tablet according to claim 32, further comprising a polarized plate arranged in front of the light-guide plate on a side of said light-guide plate opposite to said light emitting face.

36. The digitizer tablet according to claim 21, the at least one protrusion having a height and a width of between 10 $\mu$m and 50 $\mu$m.

37. The digitizer tablet according to claim 21, the bottom protrusion face of the at least one protrusion having a square shape and the light source being provided on adjacent sides of the end faces of the light-guide element.

38. The digitizer tablet according to claim 26, the at least one protrusion having a height and a width of between 10 $\mu$m and 50 $\mu$m.

39. The digitizer tablet according to claim 26, the bottom protrusion face of the at least one protrusion having a square shape and the light source being provided on adjacent sides of the end faces of the light-guide element.

40. The liquid crystal display according to claim 31, the at least one protrusion having a height and a width of between 10 $\mu$m and 50 $\mu$m.

41. The liquid crystal display tablet according to claim 31, the bottom protrusion face of the at least one protrusion having a square shape and the light source being provided on adjacent sides of the end faces of the light-guide element.

* * * * *